US011568421B1

(12) United States Patent
Weiss et al.

(10) Patent No.: US 11,568,421 B1
(45) Date of Patent: Jan. 31, 2023

(54) CLIENT SIDE DIAGNOSTICS FOR ENHANCED CUSTOMER CARE

(71) Applicant: WALGREEN CO., Deerfield, IL (US)

(72) Inventors: Benjamin Weiss, Chicago, IL (US); Arindam Bhattacharjee, Chennai (IN)

(73) Assignee: WALGREEN CO., Deerfield, IL (US)

( * ) Notice: Subject to any disclaimer, the term of this patent is extended or adjusted under 35 U.S.C. 154(b) by 462 days.

(21) Appl. No.: 16/520,617

(22) Filed: Jul. 24, 2019

(51) Int. Cl.
*G06Q 30/00* (2012.01)
*G06Q 30/02* (2012.01)

(52) U.S. Cl.
CPC ....... *G06Q 30/016* (2013.01); *G06Q 30/0281* (2013.01)

(58) Field of Classification Search
CPC .................... G06Q 30/016; G06Q 30/0281
See application file for complete search history.

(56) References Cited

U.S. PATENT DOCUMENTS

| | | | | |
|---|---|---|---|---|
| 8,332,765 | B2 * | 12/2012 | Ergan | G06F 11/0748 715/764 |
| 9,069,668 | B2 * | 6/2015 | Tak | G06F 11/3688 |
| 9,455,890 | B2 * | 9/2016 | Lad | H04L 43/0852 |
| 9,608,870 | B1 * | 3/2017 | Hendriks | G06F 3/0484 |
| 10,275,798 | B1 * | 4/2019 | Clark | G06Q 30/0267 |
| 10,503,623 | B2 * | 12/2019 | Keller | G06F 9/45558 |
| 2010/0161506 | A1 * | 6/2010 | Bosenick | G06Q 30/02 705/347 |
| 2010/0318855 | A1 * | 12/2010 | Beg | G06F 11/079 714/39 |
| 2012/0221712 | A1 * | 8/2012 | Sullivan | H04L 51/234 709/224 |
| 2015/0156061 | A1 * | 6/2015 | Saxena | H04W 4/50 715/733 |
| 2016/0142859 | A1 * | 5/2016 | Molinet | H04L 67/327 709/203 |
| 2017/0353563 | A1 * | 12/2017 | Aliabadi | H04L 67/28 |
| 2018/0081924 | A1 * | 3/2018 | Johnston | G06F 16/278 |
| 2020/0065218 | A1 * | 2/2020 | Bhosale | G06F 11/0793 |

FOREIGN PATENT DOCUMENTS

CN 109218275 A * 1/2019 ......... G06F 9/44505

OTHER PUBLICATIONS

Chen, Diagnosing Mobile app using automated UI control (Year: 2014).*
Azim, uLink enabling user defined deep linking to app content (Year: 2016).*

* cited by examiner

*Primary Examiner* — Sangeeta Bahl
(74) *Attorney, Agent, or Firm* — Marshall, Gerstein & Borun LLP; Randall G. Rueth

(57) ABSTRACT

Systems and methods are provided for diagnosing an issue associated with an enterprise application on a client device by initiating a communication from the client device to a CSR device to report the issue, generating a matter identifier associated with the reported issue, transmitting a communication containing a deep link to the client device, invoking the deep link to initiate mining of logging data corresponding to the use of the enterprise application and stored locally on the client device, formatting and/or tagging the mined logging data with the matter identifier, transmitting the formatted mined logging data from the client device to the CSR device and/or a proprietary server, analyzing the mined logging data to diagnose a source of the reported issue, and attempting to resolve the reported issue based on the analysis of the mined logging data.

19 Claims, 6 Drawing Sheets

CLIENT SIDE DIAGNOSTICS FOR ENHANCED CUSTOMER CARE

FIELD OF DISCLOSURE

The present disclosure generally relates to systems and methods for provisioning logging data associated with an enterprise mobile application. More specifically, the present disclosure relates to systems and methods for generating a deep link to mine logging data and transmitting the mined logging data to a server in furtherance of diagnosing an issue associated with an enterprise application.

BACKGROUND

Enterprises, such as retailers, have hundreds, if not thousands of actions that users may perform via an enterprise application executing on the users' devices. However, as use of such applications increases, so do instances of various operational errors and malfunctions. Fortunately, many of these reported errors and malfunctions can be easily and quickly troubleshooted and/or resolved by trained customer service representatives.

Nevertheless, a challenging aspect of troubleshooting user reported issues with an enterprise application is that a customer service representative is in a different physical location than the device itself, and the customer service representative is often incapable of seeing all of the information related to the instance of the enterprise application in the server logs. Accordingly, this can make it difficult for a customer service representative to diagnose what is causing the enterprise application to malfunction. For example, a client may report that he/she is unable to log into the enterprise application, however, the customer service representative is unable to see each and every login attempt, including failed login attempts. Thus, an error may be happening in the "local" code of the device, and a customer service representative is blind to the error.

Attempts have been made to remedy this problem by logging critical local errors and transmitting the critical local errors to a remote server for analysis. However, this technique only captures certain key events and overlooks many potential sources of errors. Conversely, reporting all the runtime activities of an enterprise application would be technologically and financially taxing. Capturing all activities of the enterprise application would slow down the operation of the application and wreak havoc on a customer's data plan because of the massive amounts of data constantly being transmitted from the device to a remote server. Additionally, sifting through logs documenting all runtime activities is tremendously time consuming and delays the diagnosis and resolution process.

Therefore, enterprises are forced to choose between a diagnostic technique that is either incomprehensive and insufficient, or excessive and unnecessarily laborious.

SUMMARY

The present application disclosure provides systems and methods for generating a deep link to mine logging data and transmit the mined logging data to a server in furtherance of diagnosing a client-side issue associated with an enterprise application.

In one embodiment, a method for diagnosing an issue with an enterprise application comprises receiving, from a customer service representative (CSR) device at a client device via a network, a communication containing a deep link to data on the client device, initiating, via a user interface of the client device, a request to mine logging data by engaging the deep link, wherein the logging data corresponds to use of the enterprise application on the client device, mining, via one or more processors of the client device, the logging data from the client device to obtain mined logging data based upon content of the deep link, formatting, via the one or more processors of the client device, the mined logging data, and transmitting, via a communication unit of the client device, the formatted mined logging data from the client device to a proprietary server associated with the CSR device via the network.

In another embodiment, a non-transitory computer-readable storage medium having stored thereon a set of instructions, executable by one or more processors executing an enterprise application of a client device comprises instructions for receiving, from a customer service representative (CSR) device at the client device via a network, a communication containing a deep link to data on the client device, instructions for initiating, via a user interface of the client device, a request to mine logging data by engaging the deep link, wherein the logging data corresponds to use of the enterprise application on the client device, instructions for mining, via one or more processors of the client device, the logging data from the client device to obtain mined logging data based upon content of the deep link, instructions for formatting, via the one or more processors of the client device, the mined logging data, and instructions for transmitting, via a communication unit of the client device, the formatted mined logging data from the client device to a proprietary server associated with CSR device via the network.

In another embodiment, a system comprises a customer service representative (CSR) device configured to transmit a communication from the CSR device to a client device, wherein the communication contains a deep link to data on the client device, and a client device having one or more processors configured to initiate a request, by engaging the deep link on the client device, to mine at least a subset of logging data from a memory storage unit, wherein the logging data corresponds to use of an enterprise application on the client device, mine at least the subset of the logging data to obtain mined logging data based upon content of the deep link, format the mined logging data, and transmit the formatted mined logging data from the client device to the a proprietary server associated with CSR device using a communication unit.

BRIEF DESCRIPTION OF DRAWINGS

The figures described below depict various aspects of the systems and methods disclosed herein. Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The present disclosure generally relates to systems and methods for obtaining logging data related to the operation of an enterprise application, more specifically to generating device deep links to mine logging data stored on a client device in furtherance of diagnosing a client-side issue related to the operation of the enterprise application on the client device. The systems, methods, and techniques disclosed herein address drawbacks of currently known techniques for diagnosing problems and resolving issues associated with use of an enterprise application on a client device. For example, the systems, methods, and techniques disclosed herein may obtain enterprise application logging data corresponding to use of an enterprise application on a client device and transmit the mined enterprise application logging data to an enterprise server in order to be analyzed in furtherance of diagnosing and resolving a problem with operating, using, or otherwise executing the enterprise application, a feature, component, or other facet on the client device.

The embodiments described herein relate to, inter alia, techniques for troubleshooting enterprise-specific applications by mining logging data. According to implementations, the systems and methods may support a dynamic, real-time or near-real-time communication, storage, mining, acquisition, analysis, diagnosis, and processing of data. A respective instance of an enterprise application (e.g., from one or more servers) is downloaded to a client device. The enterprise application captures respective enterprise application logging data corresponding to one or more user interactions with the enterprise application. The respective enterprise application logging data may include one or more indications of ordered user actions that occurred during the one or more user interactions (and optionally, of time intervals elapsing between each of the ordered user actions), and/or user attributes or documentations of instructions/code executed that correspond to such interactions. After enterprise application logging data ("logging data") is collected and saved, the technique for diagnosing an issue with the enterprise application may include initiating a communication to a customer service representative associated with the enterprise in response to experiencing an issue with the enterprise application, generating a matter identifier associated with the reported issue, transmitting a deep link to the client device containing a request to mine logging data, mining the enterprise application logging data, preparing the mined enterprise application logging data for transmission and/or analysis, transmitting the mined logging data to a server, analyzing the received mined logging data, diagnosing a source of the reported issue based on the received logging data, and attempting to resolve the reported issue.

Figure 1:
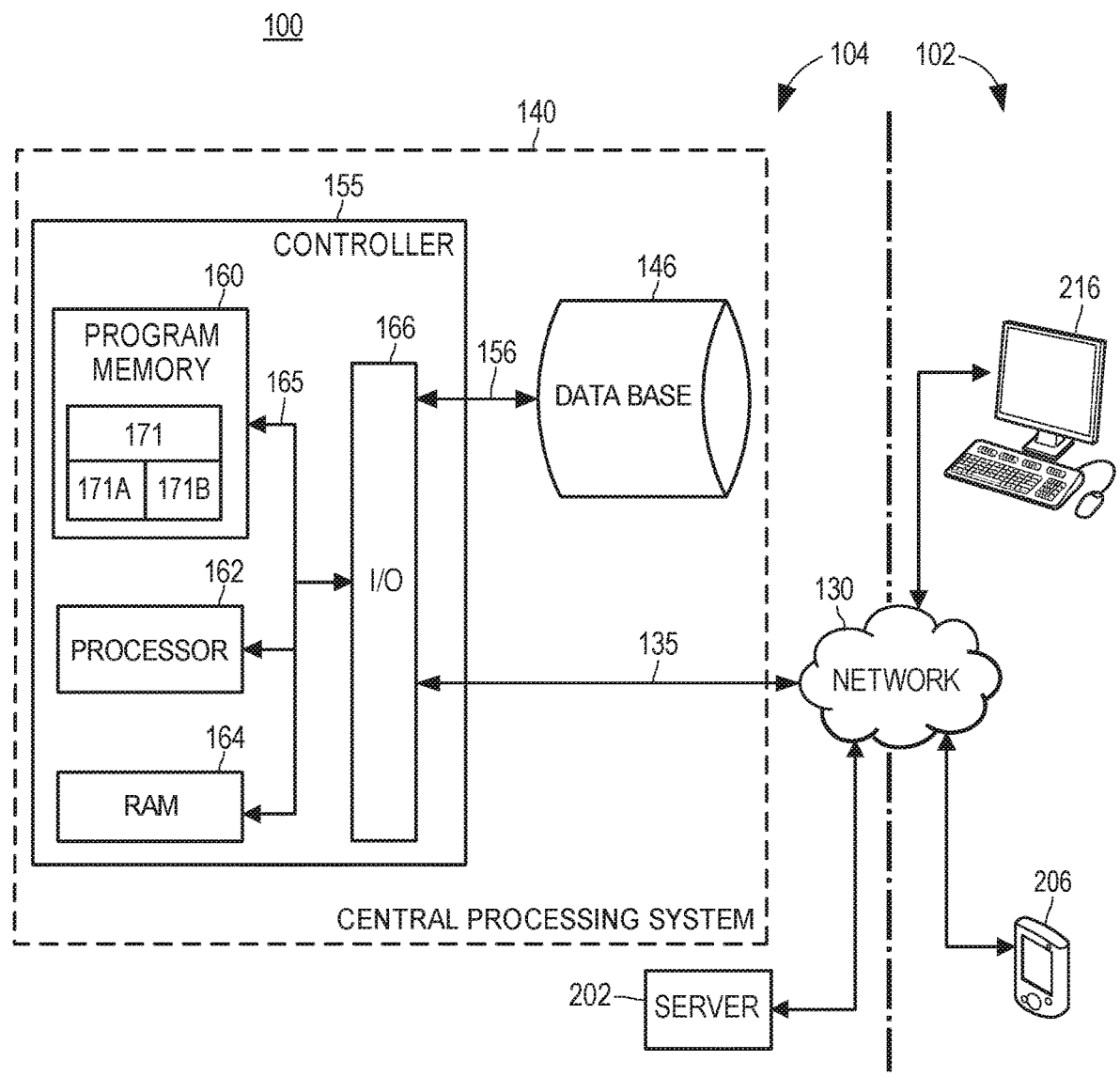
FIG. 1 illustrates a block diagram of a system in which enterprise application logging data is generated, stored, mined, packaged, transmitted, and analyzed.

As used herein, the term "enterprise application logging data," or "logging data" refers to data that is collected, captured, gathered, documented, and/or otherwise stored while an enterprise application runs on a client device during one or more sessions of use, including user interaction with the enterprise application. The enterprise application logging data may correspond to a user's actions, such as selections, key entry, submissions, etc., events (e.g., an ordered set of user actions or user events) that occur during use of the enterprise application, indications of a time interval that elapses between each user action/event, and/or optionally other information. Examples of user actions may include a tap, swipe, scroll, and/or any other interaction with the enterprise application. It should be appreciated that the terms "mine," "extract," "acquire," "retrieve," "obtain," etc., with regarding to logging data, are intended to be interpreted as the same action of obtaining logging data stored locally on the client device. Enterprise application logging data may be stored locally on the client device, transmitted to a remote third party (e.g., an enterprise device and/or server), and/or stored on a memory storage device associated with a server associated with an enterprise. Accordingly, over the course of many instances of the enterprise application on several client devices, it is possible to collect and analyze a large number of events, their sequencing, and the times elapsed between their respective occurrences. A proprietary server, a Customer Service (CSR) device, and/or a dedicated server may obtain enterprise application logging data from the enterprise application executing at multiple client devices, and the received enterprise application logging data may be stored in one or more local memories/databases of the proprietary server, may be stored remotely from the proprietary server (e.g., as illustrated in FIG. 1), and in some embodiments may include a number of separate databases (e.g., stored locally at and/or associated with the proprietary server, and others stored remotely at one or more memories that are located remotely from the proprietary server). In some embodiments, only portions of the enterprise application logging data, stored on the client device, that include one or more characteristics may be mined based on an identified or expected cause of the issue. For example, the stored enterprise application logging data corresponding to all runtime activities of the enterprise application may be filtered, for mining purposes, based on a type of action, time when the action occurred, geographic location, user demographic, and/or any other criteria, and the filtered enterprise application logging data may be mined to determine sets of ordered user events that are common for the criteria on which the enterprise application logging data was filtered. In some embodiments, mining the enterprise application logging data may include filtering enterprise application logging data and/or only mining a subset of the logging data.

As used herein, the term "issue," "malfunction," or "error" refers to a problem with the operation and/or functionality of the enterprise application on a client device such that a user is unable to perform one or more tasks/operations with the enterprise application. It should be appreciated that the use of one of these terms, instead of the others, is not intended to be limiting. Examples of such issues include but are not limited to, for example, an inability to login, inability to establish a connection with a network and/or proprietary server, inability to execute a command, delayed/slowed operation, lagging, crashing, freezing, a problem not associated with a network request, etc. In some embodiments, an issue may be observable and noticeable to a user of the enterprise application. Whereas in other embodiments, an issue may be undetectable and/or dormant. In some embodiments, an issue may correspond to a component of the client device that is integrated, coupled, or otherwise in communication with the enterprise application. For example, an issue may correspond to the enterprise application's inability to execute a specific operation because a battery of the client device is below a certain threshold, and one or more settings of the client device prevent certain applications or functions from operating when the battery is below such threshold. In some embodiments, an issue may correspond to a network connection (e.g., internet connection or mobile communication network connection) required to exchange data and signals between the proprietary server, or associated component, and the client device in order for the enterprise application to function. In some embodiments, the source/cause of an issue may be a software and/or hardware problem with the client device, the network, the enterprise application, the proprietary server, and/or a component thereof. Whereas in other embodiments, an issue may arise from a user error. For example, an issue may arise from a user incorrectly entering a password by entering the wrong character and/or failing to capitalize a character of a password or code.

As used herein, the term "deep link" refers to a transmission to a client device that contains a custom link (e.g., URL, URI scheme, etc.), pointer, or connection to initiate, activate, and/or execute a routine and/or present one or more forms of content (e.g., image, video, audio, etc.) on the client device in conjunction with the enterprise application. In some embodiments, the deep link is transmitted from a CSR device, CSR server, or proprietary server to a client device in furtherance of executing a routine to mine enterprise application logging data stored locally on the client device. The deep link may be embedded in a communication (e.g., a text message, push notification, e-mail, enterprise application message, etc.) transmitted to the client device. Opening, clicking on, pasting in a web browser, or otherwise engaging the deep link may cause the client device to activate a routine or execute a function, such as mining enterprise application logging data. In some embodiments, engaging the deep link may launch or open the enterprise application, and a user may navigate through multiple screens/frames/pages of the enterprise application to enter and/or select information and/or choose a routine/function to execute. The deep link may correspond to a request for the CSR device and/or proprietary server to access a user profile/account and/or a data storage of the client device. The user may grant access by clicking on the transmitted deep link via any suitable manner, such as touch-selecting an icon or providing a verbal command.

Generally, the term "user" is used when referring to one or more people who are operating the client device, and is not exclusive of the term "customer." The term "Customer Service Representative" is used when referring to one or more people who are operating the CSR device.

FIG. 1 illustrates a block diagram of a system 100 in which enterprise application logging data is generated, stored, mined, packaged, transmitted, and analyzed. It should be appreciated that the system 100 is merely an example and that alternative or additional components are envisioned. The system 100 includes both hardware and software applications, as well as various data communication channels for communicating data between the various hardware and software components. The system 100 may be roughly divided into front-end components 102 and back-end components 104. The front-end components may include one or more client devices 206 and one or more Customer Service Representative (CSR) devices 216. The back-end components may include a central processing system 140, a CSR server 113, and one or more proprietary servers 202.

The front-end components 102 communicate with the back-end components 104 via a digital network 130. The digital network 130 may be a proprietary network, a secure public Internet, a virtual private network or some other type of network, such as dedicated access lines, plain ordinary telephone lines, satellite links, combinations of these, etc. In embodiments in which the digital network 130 comprises the Internet, data communication may take place over the digital network 130 via an Internet communication protocol.

The client device 206 may be and/or include, by way of example, any electronic device, such as a smart phone, a desktop computer, a laptop, a tablet, a phablet, a smart watch, smart glasses, wearable electronics, pager, personal digital assistant, a home assistant and/or digital concierge device, and/or any other electronic device, including computing devices configured for wireless radio frequency (RF) communication to transmit/transfer enterprise application logging data to the proprietary server 202. The client device 206 may be communicatively connected to the CSR device 216, the CSR server 113, the proprietary server 202, the central processing system 140, other front-end components 102, and/or or back-end components 104 through the digital network 130, as described below. Components and features of the client device 206 will be discussed in greater detail with respect to FIG. 4.

One or more of the front-end components 102 may be excluded from communication with other front-end components 102 and/or the back-end components 104 by configuration or by limiting access due to security concerns. For example, the client device 206 may be excluded from direct access to the back-end components 104. In other embodiments, the client device 206 may communicate with the back-end components 104 via the digital network 130, but digital access rights, IP masking, and other network configurations may deny access to the client device 206. In some embodiments, the CSR device 216 may remotely access and/or operate the client device 206 via the enterprise application.

The CSR device 216 may be an electronic device configured to interact with the enterprise application 266 and client device 206 in furtherance of diagnosing an issue with enterprise application 266. The CSR device 216 may generate and transmit, or initiate a request to generate and transmit, a deep link to the client device 206 in furtherance of gaining access to the enterprise application logging data stored on the client device 206. The CSR device 216 may also generate a matter identifier corresponding to a user reported issue with the enterprise application. In some embodiments, the CSR device 216 may be partially or completely operated by a customer service representative. The CSR device 216 may be, by way of example, an electronic device, such as a smart phone, a desktop computer, a laptop, a tablet, a phablet, a smart watch, smart glasses, wearable electronics, pager, personal digital assistant, a home assistant and/or digital concierge device, virtual reality headset, virtual reality simulator, and/or any other electronic device, including computing devices configured for wireless radio frequency (RF) communication to receive and/or present content. The CSR device 216 may be communicatively connected to the client device 206, the proprietary server 202, the CSR server 113, and/or the central processing system 140 through the digital network 130, as described below. The CSR device 216, or a plurality of CSR devices, may communicate with the client device 206, transmit a deep link to the client device 206, receive mined logging data from the client device 206, store the mined logging data on the CSR server 113, the proprietary server 202, and/or a component thereof, analyze the received mined logging data to diagnose an issue, and/or provide instructions to a user and/or the client device 206 to resolve the issue. The CSR device 216 may include a user interface, a controller, and/or a communication unit. It should be appreciated that in some embodiments, the CSR device 216 may be a back-end component 104.

The back-end components 104 may include a central processing system 140, one or more proprietary servers 202, and the CSR server 113. The CSR server 113 may operate as a local digital network 184 that operatively connects each of a plurality of CSR devices 216 to the proprietary server 202. The CSR device 216 may be communicatively connected to different back-end components 104 having one or more functions or capabilities that are similar to the central processing system 140. The CSR server 113 may be server dedicated to store information relating to the CSR device 216 and logging data. The CSR server 113 may connect the CSR device 216 with the proprietary server 202. In some embodiments, the CSR server 113 is part of the proprietary server 202. At the CSR servers 113, the received enterprise application logging data may be analyzed to diagnose, determine, discover, or otherwise identify sequences or sets of ordered user events that occur over and over again, e.g., across multiple sessions and/or multiple client devices 206. The analysis may be adjusted based on various conditions, such as the amount of enterprise application logging data being mined, a particular attribute or condition associated with the enterprise application logging data and/or user (e.g., geographic location, demographics and/or other attributes of the user, operating system executing at a client device, version of an application executing at a client device, etc.), a comparison of a number and/or a rate of occurrences of a particular sequence of user actions/events with a comparison of the number and/or the rate of occurrences of another sequence of user action/events, and/or other criteria.

The central processing system 140 may include a database 146 and a controller 155. The controller 155 may be operatively connected to the database 146 via a link 156 connected to an input/output (I/O) circuit 166. It should be noted that, while not shown, additional databases may be linked to the controller 155. The central processing system 140 may implement the CSR server application 113. The central processing system 140 may include one or more computer processors 162 adapted and configured to execute various software applications and components of the system 100, in addition to other software applications. The database 146 is adapted to store data related to the operation of the system 100 (e.g., generate matter identifiers, generate deep links to be transmitted to the client device 206, instructions for mining logging data, instructions for bundling/encoding mined logging data into a data packet, decrypt received data packets, diagnose issues/associated with the enterprise application, etc.). The central processing system 140 may access and/or store data (e.g., deep links, enterprise application logging data, matter identifiers, etc.) in the database 146 when executing various functions and tasks associated with the operation of the system 100. Data stored in the database 146 may be delivered to the client device 206, the CSR device 216, the CSR server application 113, etc. For example, the database 146 may store enterprise application logging data received from the client device 206 that may eventually be presented via the CSR device 216 as well as a register of matter identifiers corresponding to the enterprise application logging data retrieved from the client device 206. In another example, the database 146 may store instructions for using the enterprise application 266 to extract enterprise application logging data from the client device 206.

The controller 155 includes a program memory 160, the processor 162 (may be called a microcontroller or a microprocessor), a random-access memory (RAM) 164, and the input/output (I/O) circuit 166, all of which are interconnected via an address/data bus 165. A link 135 may operatively connect the controller 155 to the digital network 130 through the I/O circuit 166. Although FIG. 1 depicts only one controller 155 with one microprocessor 162, one program memory 160, and one RAM 164, it should be understood that different quantities of each may be utilized or present. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example.

The enterprise application 266 is a proprietary application associated with a retail store (e.g., an in-store retail store, an on-line store, a mail-order store, etc.). The enterprise application 266 may be downloaded from the proprietary server 202 to the client device 206. The enterprise application 266 may be used by a customer for various product and service-related applications, such as viewing available products, ordering products, pharmacy-related services, etc. In some implementations, each instance of the enterprise application 266 executing on a respective client device 206 is associated with a particular user profile. A user profile may include any type of information associated with a user, such as a user's name, address, demographic information (age, gender, height, etc.), email address, phone number, financial account data, pharmacy records, purchase history, browsing history, and the like. User profiles may collectively be stored at a storage, and in some embodiments may include a number of separate databases (e.g., some stored locally at proprietary server 202, and others stored at one or more persistent memories that are located remotely from proprietary server 202).

The matter identifier is intended to create an association between the user, user profile, specific reported issue corresponding to a user or user profile, or the client device 206 and the enterprise application logging data associated with the user, user profile, and/or instance of the enterprise application 266 on the client device 206. The matter identifier may be a string of characters, ticket number, tag, code, and/or any other identifier intended to serve as a reference to one or more issues corresponding to use of the enterprise application 266 on the client device 206 and reported by a client to an enterprise (e.g., the proprietary server 202) or an agent of the enterprise (e.g., a client service representative operating the CSR device 216). In some embodiments, the matter identifier may correspond to a client's specific reported issue. The matter identifier may be assigned, created, generated, or otherwise requested to be assigned/created/generated, by the CSR device 216, a client service representative operating the CSR device 216, the processor 202, or a machine learning protocol. In some embodiments, specific values of the matter identifier may correspond to service codes, dates, clients, and/or other parameters. In some embodiments, a matter identifier is automatically generated when a user initiates a communication with the CSR device 216 to report an issue with the enterprise application. In embodiments in which a user transmits the enterprise application logging data from the client device 206 without the use of a deep link, the enterprise application 266 and/or the client device 206 may generate the matter identifier. In some embodiments, the matter identifier may be a random assignment of a string of characters for security purposes. In some embodiments the matter identifier, and the data to which it corresponds, may be stored on the central processing system 140, the proprietary server 202, and/or a local storage device of the CSR device 216.

In some embodiments, one or more servers may include (i) one or more processors, and (ii) one or more non-transitory memories storing instructions that, when executed by the one or more processors, cause the one or more servers to: download a respective instance of an enterprise application 266 to each of a plurality of client devices 206. The enterprise application 266 may capture respective enterprise application logging data for each use of the enterprise application 266, and the respective enterprise application logging data may include one or more indications of ordered user actions that occurred during the each user session. The one or more servers are further configured to: obtain the enterprise application logging data generated by the enterprise application 266 executing at the client devices 206, and store the enterprise application logging data at the one or more servers; discover, by mining the enterprise application logging data, a particular pattern of a sequence of user actions (and optionally, of time intervals elapsing between each of the ordered user actions, and/or user attributes) that is included in the enterprise application logging data; and determine that a number and/or a rate of occurrences of the particular pattern from the enterprise application logging data.

The program memory 160 may contain machine-readable instructions (i.e., software) 171, for execution by the processor 162. The software 171 may perform the various tasks associated with operation of the enterprise application 266 and/or troubleshooting the enterprise application 266, and may be a single module 171 or a plurality of modules 171, 172. While the software 171 is depicted in FIG. 1 as including two modules, 171 and 172, the software 171 may include any number of modules accomplishing tasks related to operation, maintenance, and troubleshooting associated with the systems and methods described herein, including, for example, data mining, encrypting and decrypting enterprise application logging data, automatically labeling and classifying retrieved data, identifying errors/malfunctions, resolving errors/malfunctions, storing data, and/or other services relating to supporting/operating an enterprise application.

It should be appreciated that the systems and methods described herein and/or any embodiments thereof may comprise different quantities and/or types of the components described. For example, although FIG. 1 depicts the system 100 as including one central processing system 140 in communication with one client device 206, one CSR device 216, etc., it should be understood that different numbers of processing systems and devices may be utilized. Further, the digital network 130 (or other digital networks, not shown) may interconnect the central processing system 140 to a plurality of included central processing systems, client devices 206, and/or CSR devices 216. Similarly, in some embodiments, multiple components may be just a single component.

Figure 2:
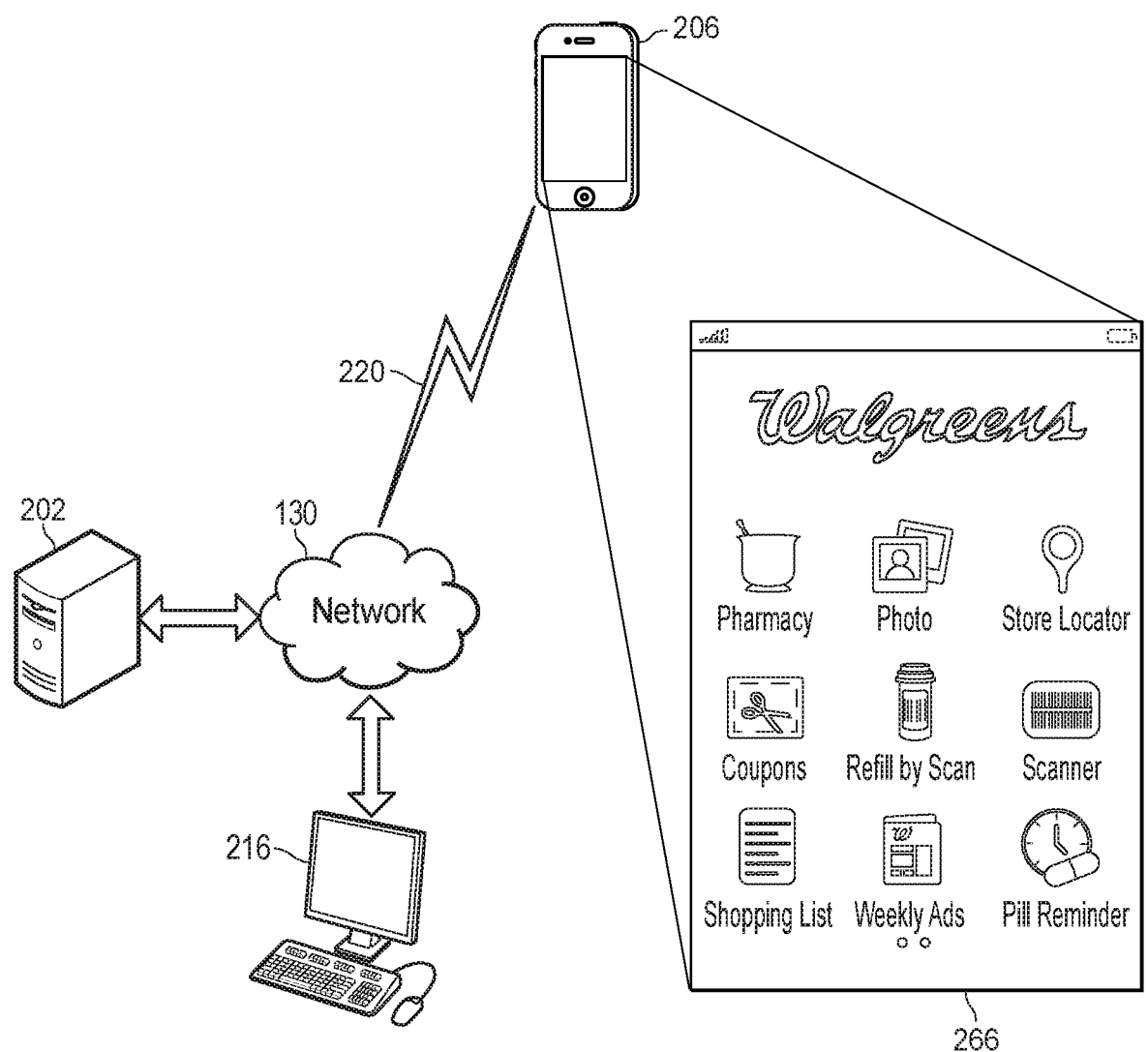
FIG. 2 illustrates a block diagram of an embodiment of the system in which a proprietary server and a client device are connected via a network.

FIG. 2 illustrates a block diagram of an embodiment of the system 100 in which a proprietary server 202, the client device 206, and the CSR device 216 are connected via the network 130. In some embodiments, implementing the system 100, the user may interact with the CSR device 216 and/or the proprietary server 202 (e.g., the central processing system 140) via a specialized application, such as the enterprise application 266, or a plurality of web pages executed on the client device 206. In some instances, the client device 206 and the CSR device 216 may communicate over the network 130 via wireless signals 220 and, in some instances, may communicate over the network 130 via an intervening wireless or wired device (not shown), such as a wireless router, wireless repeater, base transceiver station of a mobile telephony provider, etc. The client device 206 may interact with the CSR device 216, the CSR server 113, and/or the proprietary server 202 to receive web pages, information queries, or server data from the central processing system 140 and/or the proprietary server 202 and may display the web pages or server data via an enterprise application 266. It should be appreciated that although only one proprietary server 202 is depicted in FIG. 2, multiple proprietary servers 202 may be provided for the purpose of transmitting deep links to mine logging data information, storing enterprise application logging data, serving different web pages, implementing different portions of the enterprise application 266, etc. These multiple proprietary servers 202 may include a web server, an entity-specific server (e.g., an Apple® server, etc.), a server that is disposed in a local or proprietary network, an independent third-party server that is not under the control of the entity, etc.

Figure 3:
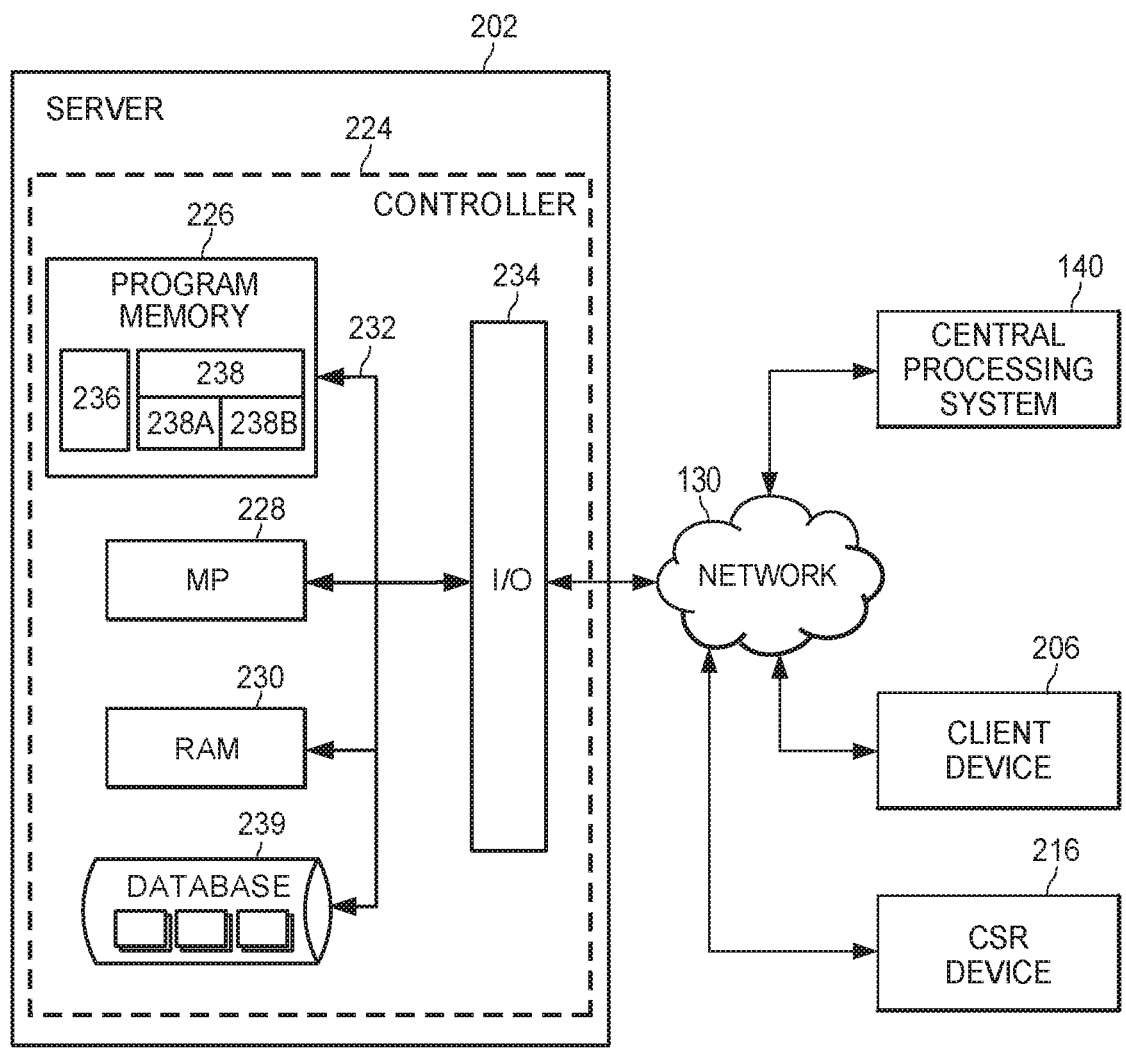
FIG. 3 illustrates a block diagram of an embodiment of the proprietary server.

FIG. 3 illustrates an embodiment of the proprietary server 202. The proprietary server may be connected to the central processing server 140, the client device 206, the CSR server 113, and/or the CSR device 216 via the network 130. The proprietary server 202 includes a controller 224. The controller 224 includes a program memory 226, a microcontroller or a microprocessor (MP) 228, a random-access memory (RAM) 230, and an input/output (I/O) circuit 234, all of which are interconnected via an address/data bus 232. The controller 224 may implement the RAM(s) 230 and the program memories 226 as semiconductor memories, magnetically readable memories, and/or optically readable memories, for example. Generally, the microprocessor 228 is executes software or computer-executable instructions stored in one or more memories of proprietary server 202, where the one or more memories may include hard drives, solid state memories, data banks, cloud data storage, etc. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, logging data, a register of a plurality of matters corresponding to a plurality of matter identifiers, instructions for transmitting a deep link to the client device 206, instructions for assigning a matter identifiers, enterprise application update patches, mobile device application data, web page templates and/or web pages, and other data necessary to interact with the user through the network 130.

The proprietary server 202 may detect an error or sub-optimal performance issue based on the received enterprise application logging data. For example, the enterprise application logging data may be directed to a particular sequence of user actions and/or events (which may be user-initiated events, enterprise application-initiated events, and/or server-initiated events) that occurred prior to the occurrence of the error or sub-optimal performance issue. Additionally or alternatively, the enterprise application logging data may be directed to lengths of time intervals elapsing between the respective occurrence of each user action/event, a particular sequence of states in which the enterprise application 266 was prior to the occurrence of the error or sub-optimal performance issue, variations thereof (e.g., to thereby test if such an error or sub-optimal performance issue also occurs for other sequences of user actions/events, elapsed time intervals, and/or enterprise application states), etc.

In an embodiment, proprietary server 202 may analyze enterprise application logging data to thereby discover one or more different patterns of user actions, where each pattern is a different sequence of user actions that occurred at the user interface of enterprise application 266 across multiple sessions and multiple client device 206. That is, each identified pattern is a respective ordered set of user actions performed repeatedly by users of enterprise application 266. In some embodiments, the proprietary server 202 may obtain different and/or additional enterprise application logging data stored on the client device 206. Additional enterprise application logging data may be added to the enterprise application logging data to thereby generate an updated set of enterprise application logging data, and the updated enterprise application logging data (or subset thereof) may be mined to thereby discover an additional and/or a change to a previously identified pattern.

In some embodiments, the proprietary server 202 may act as a routing or interfacing server between the client device 206, the CSR device 216, and/or the central processing system 140 in order to assist in facilitating some of the functionality of the system 100. For example, the proprietary server 202 may communicate with the central processing system 140, the client device 206, and/or the CSR device 216 via a multitude of protocols, such as packet-switched protocols, web services, web APIs (Application Programming Interface), etc. The proprietary server 202 may also convert (if necessary) and route enterprise application logging data, such as bundled data packets containing logging data and a corresponding matter identifier, to the appropriate server, such as the central processing system 140. In some embodiments, the proprietary server 202 may act as the destination server and need not route any data from the client device 206 and/or to the CSR device 216. It should be appreciated that references made throughout this disclosure to transmitting or receiving data/packets/etc. to and/or from the proprietary server 202 may also entail transmitting or receiving data/packets/etc. to and/or from the central processing system 140, the CSR server 113, and/or the CSR device 216, either directly or indirectly. Proprietary server 202 may be an individual server (e.g., the CSR server 113), a group (e.g., cluster or cloud) of multiple servers, or another suitable type of computing device or system. However, the proprietary server 202 is referred to in the singular tense herein for ease of reading (and not limitation) purposes.

The program memory 226 and/or the RAM 230 may store various applications for execution by the microprocessor 228. For example, a user-interface application 236 may provide a user interface to the proprietary server 202, which may, for example, allow a customer service representative to transmit a deep link to the client device 206, select parameters/characteristics of mining initiated by a deep link transmitted to the client device 206, generate a matter identifier, view logging data received from the client device 206, configure, and/or or control/direct various aspects of the operations of the CSR server 113, or otherwise to access information thereon. A server application 238 operates to populate and transmit deep links, instructions, embedded messages/signals, and/or web pages to the client device 206, retrieve logging data from the client device 206, and/or exchange appropriate data to the central processing system 140, the proprietary server 202, and the CSR device 216. The server application 238 may be a single module 238 or a plurality of modules 238A, 238B. While the server application 238 is depicted in FIG. 3 as including two modules, 238A and 238B, the server application 238 may include any number of modules executing functions and/or accomplishing tasks related to implementation of the proprietary server 202. By way of example, the module 238A may generate a deep link and transmit the deep link to the client device 206, while the module 238B may receive, store, and evaluate logging data received from the client device 206. Although FIG. 3 depicts only one controller with one microprocessor 228, one program memory 228, and one RAM 230, it should be understood that different quantities of each may be utilized or present. Similarly FIG. 3 depicts the I/O circuit 234 as a single block, the I/O circuit 234 may include a number of different types of I/O circuits.

Figure 4:
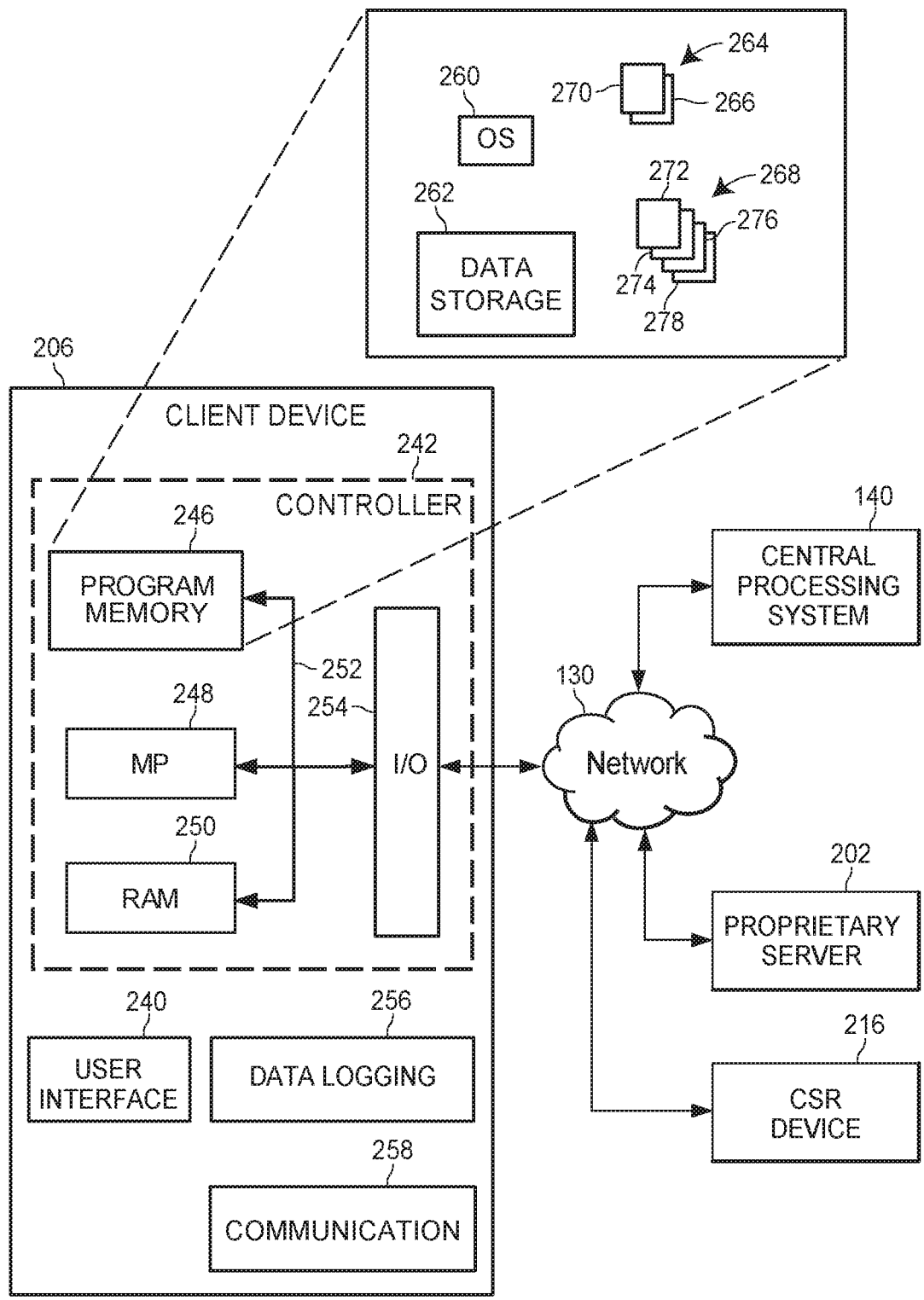
FIG. 4 illustrates a block diagram of a client device.

FIG. 4 illustrates a block diagram of an embodiment of the client device 206. The client device 206, or a plurality of client devices, may operate an enterprise application 266 and store corresponding information/data therein. The client device 206 transmits the stored enterprise application logging data to the CSR device 216 in furtherance of diagnosing and/or resolving an issue associated with the enterprise application 266. The client device 206 may be connected to the central processing server 140, proprietary server 202, CSR server 113, and/or CSR device 216 via the network 130. The client device 206 may include a user interface 240, a controller 242, an enterprise application data logging unit 256, and a communication unit 258.

The user interface 240 may be configured to present information to the user and/or receive inputs from the user, and may accordingly include a set of I/O components (e.g., capacitive or resistive touch sensitive input panels, keys, buttons, lights, LEDs, cursor control devices, haptic devices, and others). In some embodiments, the user interface 240 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 240 may include one or more user-input devices (not shown). In some embodiments, the user-input device may include a "soft" keyboard that is displayed on a display/screen of the client device 206, an external hardware keyboard communicating via a wired or a wireless connection (e.g., a Bluetooth keyboard), an external mouse, or any other suitable user-input device. In some embodiments, the user input device may be one or more auxiliary input ports such as a USB, lightning port, audio out, video out, etc. It should be appreciated that in some embodiments, the user input device and user output device may be a single I/O component. The user interface 240 may display a request, transmitted as a deep link by a component of the enterprise network (e.g., the CSR device 216, the CSR server 113, the proprietary server 202, etc.), to access and mine enterprise application logging data from the client device 206. In some embodiments, the user interface 240 may enable a user to make selections relating to mining enterprise application logging data from the client device 206 and transmit the logging data to the enterprise network (e.g., the CSR device 216, the CSR server 113, the proprietary server 202, etc.).

The controller 242 includes a program memory 246, one or more microcontroller or a microprocessor (MP) 248, a random-access memory (RAM) 250, and an input/output (I/O) circuit 254, all of which are interconnected via an address/data bus 252. The program memory 246 includes an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The enterprise application data logging unit 256 collects/captures and stores data indicative of and/or related to use and operation of the enterprise application 266 executing on the client device 206. The enterprise application data logging unit 256 may be built into, or a component of, the client device 206. In some embodiments the enterprise application logging data may be collected on a session-by-session basis. As is understood by one of ordinary skill in the art, a "session" is a basic unit of measurement of user engagement with an application, and generally refers to the period of time that a user has the application open in the foreground, and during which a user action or event occurs, is sent, or "is fired" prior to a pre-defined length of time (e.g., five minutes). Events that occur within the pre-defined length of time of each other are counted towards a current session.

The data storage 262 may house data such as enterprise application logging data for the enterprise application 266, user profiles, application data for the plurality of applications 264, routine data for the plurality of routines 268, and other data necessary to interact with, execute, or otherwise operate the enterprise application 266 on the client device 206. The data storage 262 may retain the enterprise application logging data, for a predefined duration of time (e.g., 24 hours, 7 days, 30 days, 90 days, etc.), before ceasing storage (i.e., deleting/removing from storage). In some embodiments the data storage 262 may store a specific type of enterprise application logging data that includes or corresponds to specific/certain characteristics or attributes. For example, the data storage 262 may only retain enterprise application logging data corresponding to failed login attempts, instances in which the enterprise application 266 crashed or froze, logging data corresponding to use of the enterprise application 266 during certain hours of the day, etc. A predetermined amount of storage (e.g., 50 MB, 1 GB, etc.) of the data storage 262 may be devoted to storing/retaining the enterprise application logging data. The data storage 262 may retain the enterprise application logging data until reaching the capacity of the predetermined amount of storage (e.g., 50 MB, 1 GB, etc.) of the data storage 262, at which point a specific type of previously stored enterprise application (e.g., the oldest/least recent stored logging data, logging data corresponding to a specific action, non-essential logging data, etc.) may be deleted/removed/eliminated in order to make space for new and/or otherwise more critical/important enterprise application logging data.

In some embodiments, the controller 242 may also include, or otherwise be communicatively connected to, other data storage mechanisms (e.g., one or more hard disk drives, optical storage drives, solid state storage devices, etc.) that reside within the client device 206. Although FIG. 4 depicts only one controller 242 with one microprocessor 248, one program memory 246, and one RAM 250, it should be understood that different quantities of each may be utilized or present. Similarly, FIG. 4 depicts the I/O circuit 254 as a single block, but the I/O circuit 254 may include a number of different types of I/O circuits. The controller 242 may implement the RAM(s) 250 and the program memories 246 as semiconductor memories, magnetically readable memories, and/or optically readable memories, for example.

For example, the client device 206 may include a database of files 239 within the memory. In some embodiments, the database 239 may be additionally or alternatively stored at a server (e.g., the proprietary server 202, etc.) and/or another third party server (such as one associated with DropBox, Amazon, Google Drive, iCloud, etc.). In some embodiments the database 146 may store the same data stored on the database 239. Although FIG. 4 depicts the database 239 as coupled to the client device 206, it is envisioned that the database 239 may be maintained in the "cloud" such that any element of the environment 100 capable of communicating over the network 130 may directly interact with the database 239.

The communication unit 258 may communicate with the CSR device 216, the CSR server 113, and/or the proprietary server 202 via any suitable wireless communication protocol network (e.g., GSM, CDMA, TDMA, WCDMA, LTE, EDGE, OFDM, GPRS, EV-DO, UWB, IEEE 802 including Ethernet, WiMAX, Wi-Fi, Bluetooth, and others). The communication unit 258 receives a deep link, or an embedded signal/message containing a deep link, from the CSR device 216, the CSR server 113, and/or the proprietary server 202. The communication 258 also transmits a data packet, containing mined enterprise application logging data, to the CSR device 216, the CSR server 113, and/or the proprietary server 202. It should be appreciated that the communication unit 258 may be a single component, such as a transceiver, or multiple components, such as a separate receiver and transmitter. The communication unit 258 may be used by a user to initiate a communication with the CSR device 216 to report an issue with the enterprise application 266.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be an enterprise application 266 that may be implemented as a series of machine-readable instructions for performing the various tasks associated with receiving information at, displaying information on, and transmitting information from the client device 206. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the proprietary server 202, while also receiving inputs from the user.

In some embodiments, the one or more of the plurality of software routines 268 may include an enterprise application data logging routine 272, a logging data mining routine 274, a logging data packaging routine 276, and a logging data transmission routine 278.

The enterprise application data logging routine 272 may be implemented as a series of machine-readable instructions for causing the enterprise application logging data unit 256 to log, collect, capture, record, and/or otherwise document data corresponding to using and operating the enterprise application 266. The enterprise application data logging routine 272 may cause the enterprise application logging data unit 256 to store the collected enterprise application logging data in the data storage 262. The enterprise application data logging routine 272 may collect and store enterprise application logging data in the data storage 262 whenever the enterprise application 266 is operating on the device 206 and/or the user is engaging/interacting with the enterprise application 266. The enterprise application data logging routine 272 may execute on a session-by-session basis. The enterprise application data logging routine 272 may collect and save every front-end interaction of a user engaging the enterprise application 266 on the client device. The enterprise application data logging routine 272 may collect and save every back-end execution or operation corresponding to the delivery/execution/presentation of the enterprise application 266 by the proprietary server 202 and/or corresponding to a user initiated interaction with the enterprise application 266 on the client device 206.

In some embodiments, the enterprise application data logging routine 272 may collect all enterprise application logging data but only save, in the data storage 262, a subset of all of the collected enterprise application logging data. In some embodiments, the enterprise application data logging routine 272 may only collect certain types of enterprise application logging data. For example, the enterprise application data logging routine 272 may only collect enterprise application logging data corresponding to failed login attempts by the user, instances in which the enterprise application 266 crashed or froze, instances in which signal/data exchange between the enterprise application 266 and the proprietary server 202 exceeded and/or fell below a predetermined threshold value of specific characteristics/metric/etc., and/or any other issue associated with operating the enterprise application 266 on the client device 206. In some embodiments, the enterprise application data logging routine 272 may be restricted from collecting and/or saving a certain type of enterprise application logging data based on a user's settings, selections, preferences, or other choices. For example, a user may restrict the enterprise application data logging routine 272 from collecting and saving enterprise application logging data corresponding to products viewed on the enterprise application 266 but not purchased using the enterprise application 266. In another example, the enterprise application data logging routine 272 may not collect and/or store enterprise application logging data corresponding to data that is protected in accordance with data privacy and security laws of a jurisdiction, such as medical or personal information protected by HIPAA.

The logging data mining routine 274 may be implemented as a series of machine-readable instructions for the proprietary server 202 to mine, acquire, search, or otherwise gain access to the enterprise application logging data stored the client device 206. In some embodiments, the logging data mining routine 274 may selectively mine a subset of the enterprise application logging data from all of the stored enterprise application logging data. In some embodiments, the logging data mining routine 274 may be initiated by a user of the client device 206 actively selecting/engaging a command to commence mining logging data. In some embodiments, the logging data mining routine 274 may be automatically executed after receiving, clicking on, and/or otherwise engaging a deep link on the client device 206. In some embodiments, a customer service representative, operating/controlling the CSR device 216, may remotely initiate the logging data mining routine 274. In some embodiments, prior to execution, a user, client services representative, or AI system may apply/select one or more filters, parameters, rules, limitations, and/or characteristics for the logging data mining routine 274 such that the logging data mining routine 274 extracts only the logging data for a specific event, occurrence, or characteristic. For example, a client services representative may select a parameter for the logging data mining routine 274 to only mine for logging data collected within the last 7 days and relating to using the enterprise application 266 to attempt to locate the most proximate retail store.

The logging data packaging routine 276 may be implemented as a series of machine-readable instructions for formatting, filtering, bundling, modifying, and/or otherwise preparing the mined enterprise application logging data for transmission, via the communication unit 258, to the CSR device 216, the CSR server 113, and/or the proprietary server 202. In some embodiments, the logging data packaging routine 276 bundles, tags, or otherwise modifies the enterprise application logging data to include the matter identifier that corresponds to the issue for which logging data is being obtained in order to resolve. In some embodiments, the logging data packaging routine 276 may modify the enterprise application logging data so that it is in a compatible format or file type to be transmitted/uploaded/stored on the proprietary server 202. In some embodiments, the logging data packaging routine 276 encodes the logging data to conform to a specific data transmission protocol. In some embodiments, the logging data packaging routine 276 encrypts and/or employs other data security measures in furtherance of safely and securely transmitting the logging data to the intended recipient. In some embodiments, the logging data packaging routine 276 may be initiated by a user of the client device 206 actively selecting/engaging a command to package the mined logging data. Whereas in other embodiments, the logging data packaging routine 276 may be automatically executed after successfully mining the enterprise application logging data from the data storage 262. In some embodiments, a customer service representative, operating/controlling the CSR device 216 may remotely initiate the logging data packaging routine 276.

The logging data transmission routine 278 may be implemented as a series of machine-readable instructions for transmitting, or causing the communication unit 258 to transmit, the logging data, packaged by the logging data packaging routine 276, from the client device 206 to the CSR device 216, the CSR server 113, the proprietary server 202, and/or the central processing system 140, or component thereof. In some embodiments, the logging data transmission routine 278 may be initiated by a user of the client device 206 actively selecting/engaging a command to transmit the logging data. In some embodiments, the logging data transmission routine 278 may be automatically executed after the logging data packaging routine 276 has completed preparing the mined enterprise application logging data for transmission. In some embodiments, a customer service representative, operating/controlling the CSR device 216 may remotely initiate the data transmission routine 278.

In operation, a user may launch the enterprise application 266 on the client device 206 to access the proprietary server 202 cooperating with the central processing system 140. The enterprise application data logging routine 272 may be executed to cause the enterprise application data logging unit 256 to collect/capture front-end interactions and/or back-end operations of the enterprise application 266 while a user operated the enterprise application 266 on the client device 206. The enterprise application data logging unit 256 stores this enterprise application logging data in the data storage 262. In response to experiencing an issue with the enterprise application 266, in one embodiment, the user may initiate a communication with a customer service representative operating the CSR device 216. In response to this communication, one or more matter identifiers are generated. After generating and assigning the matter identifier, the CSR device 216 then generates and transmits a deep link, stored in the proprietary server 202, to the client device 206. Once the deep link is received and engaged on the client device 206, the logging data mining routine 274 is executed to extract the enterprise application logging data stored in the data storage 262. After the enterprise application logging data is mined, the logging data packaging routine 276 is executed to prepare the mined enterprise application logging data for transmission. The logging data packaging routine 276 may modify and/or package the mined logging data such that it is coupled, embedded, or otherwise associated with the assigned matter identifier, and then encodes this data into a data packet. Once the logging data packaging routine 276 generates a data packet containing the mined logging data for transmission, the logging data transmission routine 278 is executed to cause the communication unit 258 to transmit the data packet to the CSR device 216 and/or the proprietary server 202. The data packet may be decoded by the CSR device 216 and/or the proprietary server 202, and the extracted logging data may be stored in accordance with the matter identifier on the proprietary server 202. After receiving the mined logging data, the CSR device 216 and/or the proprietary server 202 may analyze the logging data to identify the source of the issue. The customer service representative, via the CSR device 216, may attempt to resolve the issue by transmitting an update, may provide instructions to the user to manually execute, and/or may otherwise troubleshoot the enterprise application 266. If this does not resolve the issue, the CSR device 216 may further analyze the logging data, and in some instances may generate an additional deep link configured to re-mine the client device 206 for logging data. If the issue is correctly diagnosed and resolved, the solution that resolved the issue may be saved to the proprietary server 202 in conjunction with the matter identifier and/or the received extracted enterprise logging data.

In another embodiment of operation, in response to experiencing an issue with the enterprise application 266, the user may initiate a request/selection in the enterprise application 266 to mine the enterprise logging data and transmit the mined logging data to the CSR device 216 and/or the proprietary server 202. After selecting to mine the logging data, the user may be prompted to enter information regarding the issue in order to aid with diagnosing the issue. Additionally, selecting this button may cause the enterprise application 266 to generate one or more matter identifiers corresponding to the issue. After initiating the request, the logging data mining routine 274 is executed to mine the enterprise application logging data stored in the data storage 262. After the enterprise application logging data is mined, the logging data packaging routine 276 is executed to prepare the mined enterprise application logging data for transmission. The logging data packaging routine 276 may modify and/or package the mined logging data such that it is coupled, embedded, or otherwise associated with the assigned matter identifier, and then encodes this data into a data packet. Once the logging data packaging routine 276 generates a data packet containing the mined logging data for transmission, the logging data transmission routine 278 is executed to cause the communication unit 258 to transmit the data packet to the CSR device 216 and/or the proprietary server 202. The data packet may be decoded by the CSR device 216 and/or the proprietary server 202, and the extracted logging data may be stored in accordance with the matter identifier on the proprietary server 202. After receiving the mined logging data, the CSR device 216 and/or the proprietary server 202 may analyze the logging data to identify the source of the issue. The customer service representative, via the CSR device 216, may attempt to resolve the issue by transmitting an update, may provide instructions to the user to manually execute, and/or may otherwise troubleshoot the enterprise application 266. If this does not resolve the issue, the CSR device 216 may further analyze the logging data, and in some instances may generate an additional deep link configured to re-mine the client device 206 for logging data. If the issue is correctly diagnosed and resolved, the solution that resolved the issue may be saved to the proprietary server 202 in conjunction with the matter identifier and/or the received extracted enterprise logging data.

In an embodiment, a client device 206 may store machine-readable code, stored in a memory therein, representative of collecting, storing, extracting, and transmitting logging data corresponding to the operation of an enterprise application 266 on the client device 206. As part of this, the user may launch and/or execute the enterprise application 266. In response, the client device 206 may display one or more interfaces of the enterprise application that may direct the user through the process of granting access to the proprietary server 202 to mine the enterprise application logging data from the data storage 262 of the client device 206, and grant permission to the proprietary server 202 to extract the enterprise application logging data, modify/format the enterprise application logging data, and transmit the enterprise application logging data to proprietary server 202. In some embodiments, the client device 206 may include a browser application that enables the user to navigate to a website to perform a task and/or functionality associated with the mining and transmission of the enterprise application logging data.

Figure 5:
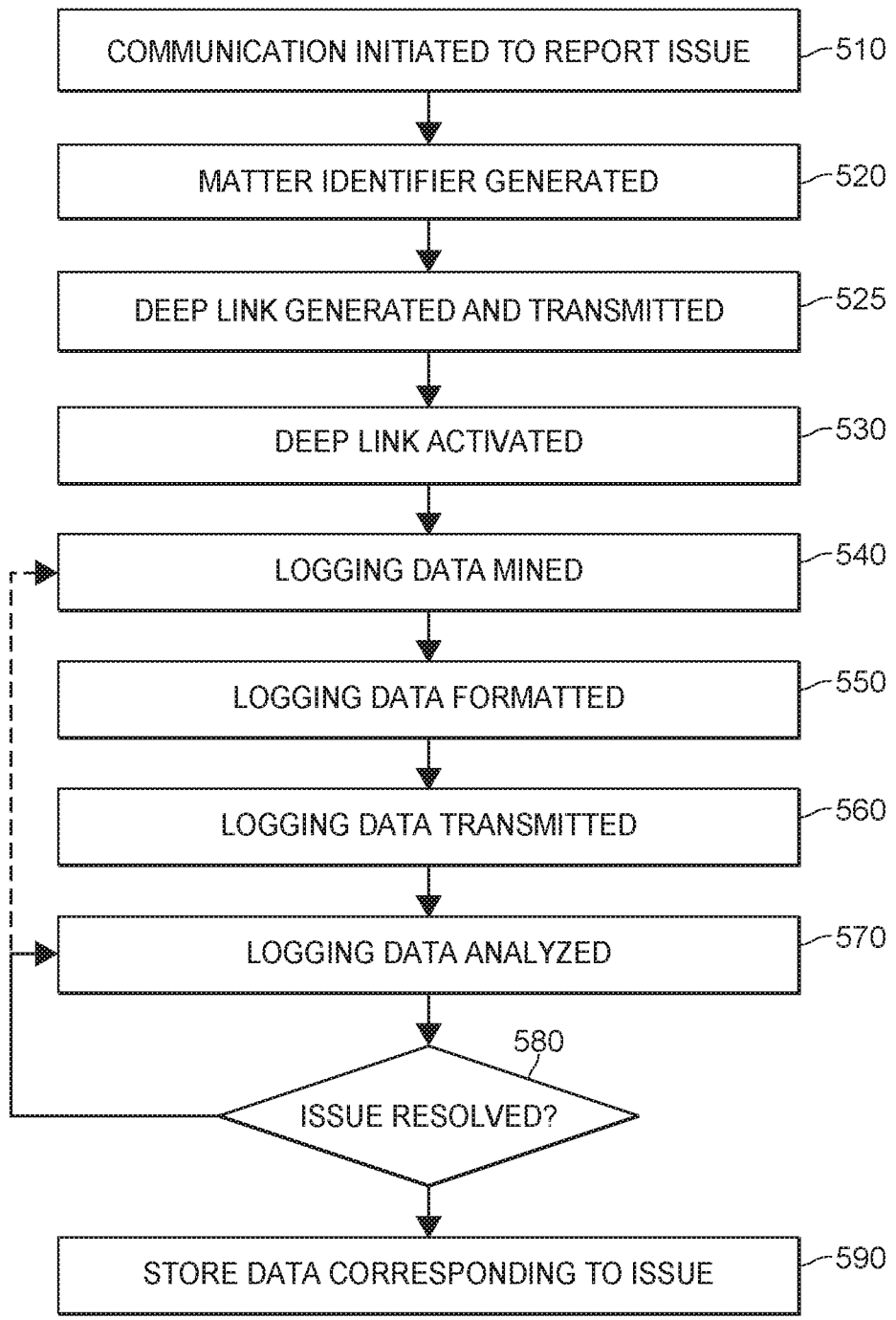
FIG. 5 illustrates a first method for extracting enterprise application logging data from a client device.

FIG. 5 illustrates a first method 500 for extracting enterprise application logging data from a client device 206. The method 500 may be implemented as described above with FIGS. 1, 2, 3, and 4. Accordingly, the method 500 may be partially or completely implemented over a network (e.g., the network 130 of FIG. 1).

In the method 500, a client device (e.g., the client device 206 of FIG. 4) initiates a communication with a customer service representative ("CSR") device (e.g., the CSR device 216 of FIG. 1) when an enterprise application (e.g., the enterprise application 266 of FIG. 4) experiences an issue (block 510). The enterprise application may display one or more images via a user interface (e.g., the user interface 240 of FIG. 4) prompting a user to select a type of communication (e.g., telephonic, video conferencing, text message, e-mail, etc.) to initiate with the customer service representative to report the issue with the enterprise application. It should be appreciated that in some embodiments, the client device may directly connect to the CSR device. For example, the client device may call a customer service telephone number exclusively linked to a specific CSR device or network of CSR devices. Whereas in other embodiments, the client device may initially be in indirect communication with the CSR device. For example, the client device may call a general customer service telephone number, and may be directed to a specific CSR device based on a reported issue or selection of different parameters. Similarly, for example, the client device may call a dedicated customer service telephone number, and then may be linked to the next/first available CSR device.

In response, to receiving the communication corresponding to the issue with the enterprise application, the CSR device generates a matter identifier corresponding to the reported issue (block 520). The matter identifier may be a file or other type of data that includes the type of issue, first instance of the issue, frequency of the issue, duration of the issue, date of reporting the issue, serial number of the client device, information corresponding to the user or a user profile associated with the instance of the enterprise application, and/or any other information that may be of use in resolving the reported issue and maintaining records of the issue.

After generating the matter identifier, a deep link is generated and transmitted to the client device (block 525). The deep link corresponds to a request to mine enterprise application logging data stored in a data storage (e.g., the data storage 262 of FIG. 4) of the client device. The enterprise application logging data represents front-end and back-end interactions with and operations of the enterprise application. Evaluating enterprise application logging data enables a customer service representative, the CSR device, a proprietary server, or a component thereof to diagnose and resolve an issue with the enterprise application by seeing the precise data, code, instructions, and/or other operations being executed, or attempting to be executed, in conjunction with the enterprise application of the client device. The deep link is transmitted over a network (e.g., the network 130 of FIG. 1).

After receiving the deep link, a user activates the deep link to initiate extracting the enterprise application logging data (block 530). The deep link may be initiated by a user receiving a communication (e.g., a text message, push notification, e-mail, enterprise application message, etc.) containing the deep link, opening the communication, and/or clicking on or otherwise activating an embedded link, icon, or other indicator. In some embodiments, the user may be presented a prompt to accept/allow or deny/reject a request to access the enterprise application logging data. When the user engages the deep link or accepts the request to access/share the enterprise application logging data, the method 500 proceeds to block 540. When the user does not engage/click on the deep link or denies/rejects the request to access/share the enterprise application logging data, then the method 500 does not proceed.

The enterprise application logging data is mined after the deep link is engaged (block 540). The enterprise application logging data may be mined by the enterprise application initiating an enterprise application logging data mining program or routine (e.g., the enterprise logging data mining routine 274 of FIG. 4). The enterprise logging data mining routine mines logging data from one or more local memory/data storages (e.g., the data storage 262 of FIG. 4) of the client device. In some embodiments, the enterprise logging data mining routine may execute to retrieve part or all of the logged data relating to the enterprise application from the client device. In some embodiments, this may include retrieving a complete log file or files stored on the client device. In alternative embodiments, the enterprise logging data mining routine may parse the deep link to extract parameters or conditions for data to be retrieved, then retrieve a subset of the logged data stored on the client device that meets such parameters or conditions.

After successfully mining the enterprise application logging, the logging data is prepared for transmission (block 550). A logging data packaging routing (e.g., the logging data packaging routine 276 of FIG. 4) may be executed to format, package, and/or otherwise prepare the mined logging data for transmission to the CSR device and/or the proprietary server. It should be appreciated that in some embodiments, the method 500 may not include block 550 because the mined logging data is already in a condition or format that is acceptable and/or otherwise ready for transmission to the CSR device and/or the proprietary server. In some embodiments, the logging data packaging routine may comprise one or more subroutines to prepare the mined logging data for transmission. For example, a first subroutine may convert the mined logging data from one format to another format, a second subroutine may filter the mined logging data to remove any unnecessary data, and/or a third subroutine may tag the logging data with the matter identifier. It should be appreciated that in such embodiments, the one or more subroutines may be executed in a particular order in order to optimize the data packaging process. The logging data packaging routine may also adhere to one or more data transmission protocols, and execute one or more processes to prepare the logging data for transmission in compliance with such protocol. For example, the logging data packaging routine may encode the logging data in a data packet, and then add one or more header, parity, signature, and/or security bits to the data packet. Similarly, the logging data packaging routine may include security encryption procedures. After the logging data is prepared for transmission, the method proceeds to block 560.

The mined logging data is transmitted from the client device (block 560). The logging data may be transmitted by a communication unit (e.g., the communication unit 258 of FIG. 4), of the client device, to the CSR device and/or the proprietary server over a network (e.g., the network 130). Once received, the transmitted logging data may be decoded, formatted, unpackaged, or otherwise extracted from the data packet transmitted by the client device. In some embodiments, the received logging data may be stored in a local and/or a remote memory/data storage (e.g., the database 146 of FIG. 1) of the CSR device, CSR server, and/or the proprietary server.

After receiving the logging data, the logging data is analyzed to identify the source of the reported issue (block 570). A matter number may be extracted from the received data to match the logging data with a record of the issue with the enterprise application on the client device. The CSR device may analyze the received logging data to diagnose the source/cause of the issue. In some embodiments, the logging data may be analyzed by executing an issue identifying routine and/or by a customer service representative manually diagnosing the logging data.

An attempt to resolve the reported issue is made based on the analysis of the mined logging data (block 580). In some embodiments, the CSR device and/or proprietary server may attempt to resolve the issue by transmitting a command, signal, direction, and/or operation to be executed by the enterprise application and/or the user of the client device. For example, the CSR device may transmit a signal indicative of an update to the enterprise application that contains a software patch to resolve the reported issue. In some embodiments, the CSR device may be granted remote read/write access to the instance of the enterprise application on the client device in order to troubleshoot the enterprise application. For example, the CSR device may be able to enter commands and/or modify the enterprise application on the client device without being in physical possession of the client device. Accordingly, the CSR device, for example, may remotely modify the settings of the enterprise application or clear a cache in furtherance of resolving the reported issue. Generally speaking, the CSR device may provide one or more potential solutions to resolve the reported issue. For example, the CSR device may a reset a password associated with a client profile of the user, or freeze/unfreeze access to the enterprise application. When the issue is resolved, the method 500 proceeds to block 590. However, when the issue is not resolved, the method 500 may return to block 580 to continue diagnose the mined logging data to identify other potential sources of the reported issue and potential solutions to the reported issue. In some embodiments, when the issue is not resolved, the method 500 may return to block 530 to mine different and/or additional logging data. In such embodiments, different parameters may be selected for mining the logging data.

Data corresponding to the reported issue and/or how it was resolved is stored after resolving the issue (block 590). The data may be stored remotely and/or locally in a memory/data storage or database of the CSR device, CSR server, and/or proprietary server. In some embodiments, the logging data associated with the reported issue are stored with reference to the matter identifier and/or a client profile. In some embodiments, the data may be stored with other reported/known instances of the same and/or a similar reported issue. The CSR device, CSR server, and/or proprietary server may aggregate data and solutions corresponding to a certain type of issue in furtherance of developing future solutions. The CSR device, CSR server, and/or proprietary server may recognize a certain type of issue with a certain subset of users of the enterprise application, and accordingly may automatically generate a command to transmit to all users of said subset. For example, based on receiving and documenting a large quantity of issues relating to users who use the enterprise application to manage the fulfillment of their prescription medications, the CSR device, CSR server, and/or proprietary server may transmit a command to all users of the enterprise application that use the enterprise application to fulfill the prescriptions, in order to preemptively resolve an issue before it can be realized/recognized by a user. In some embodiments, an issue may be considered resolved for purposes of storing data and terminating the method 500 when a cause of the issue cannot be determined or a solution to the issue cannot be identified after a number of attempts or a duration of attempted remediation.

Figure 6:
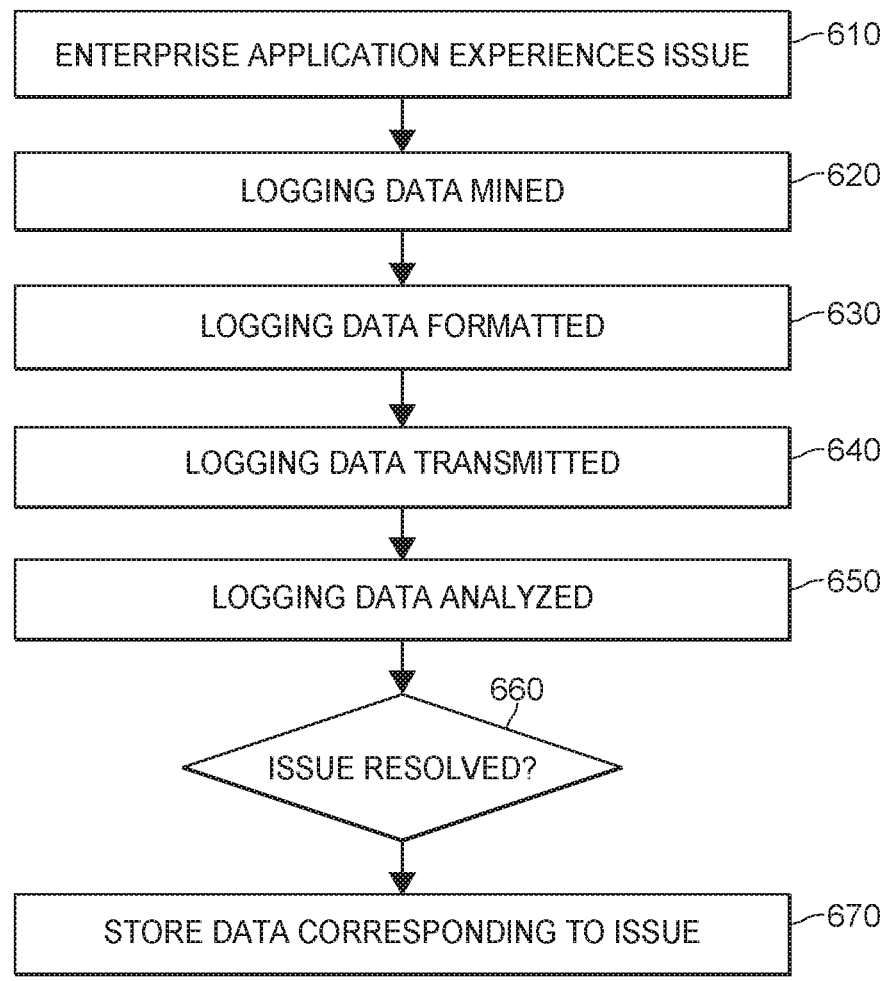
FIG. 6 illustrates a second method for extracting enterprise application logging data from a client device.

FIG. 6 illustrates a second method 600 for extracting enterprise application logging data from a client device 206. The method 600 may be implemented as described above with FIGS. 1, 2, 3, and 4. Accordingly, the method 600 may be partially or completely implemented over a network (e.g., the network 130 of FIG. 1). It should be appreciated that one or more steps of the method 600 may operate in the same or a similar manner as one or more steps of the method 500 as described above. The method 600 as whole may operate in the same or a similar manner as the method 500, however, the method 600 is intended to cover an embodiment of the system in which a user of the enterprise application extracts and transmits the enterprise application logging data.

In the method 600, a user experiences an issue while using the enterprise application e.g., the enterprise application 266 of FIG. 4) on a client device (e.g., the client device 206 of FIG. 4) (block 610).

In response to experiencing this issue, a user may initiate a request to gather enterprise application logging data in furtherance of reporting and resolving the issue (block 620). In some embodiments, the user may select an icon within the enterprise application associated with reporting an issue. In some embodiments, the user may navigate through one or more screens/frames of the enterprise application to initiate a logging data mining routing. For example, the user may be prompted to enter information relating to the issue. Based on this entry, the enterprise application may generate a matter identifier corresponding to the reported issue. After generating the matter identifier, the user may be prompted with a request to access enterprise application logging data stored in a data storage (e.g., the data storage 262 of FIG. 4) of the client device. The enterprise application logging data may be mined by the enterprise application initiating an enterprise application logging data mining program or routine (e.g., the enterprise logging data mining routine 274 of FIG. 4). The enterprise logging data mining routine mines data from one or more local memory/data storages (e.g., the data storage 262 of FIG. 4) of the client device. In some embodiments, the enterprise logging data mining routine may be executed to mine logging data stored on a server or memory storage located remotely from the client device. Block 620 of the method 600 may operate in the same or similar manner as block 540 of the method 500, as described above.

After successfully mining the enterprise application logging data, the logging data is prepared for transmission (block 630). A logging data packaging routine (e.g., the logging data packaging routine 276 of FIG. 4) may be executed to format, package, and/or otherwise prepare the mined logging data for transmission to the CSR device and/or the proprietary server. It should be appreciated that in some embodiments, the method 600 may not include block 630 because the mined logging data is already in a condition or format that is acceptable and/or otherwise ready for transmission to the CSR device and/or the proprietary server. In some embodiments, the logging data packaging routine may comprise one or more subroutines to prepare the mined logging data for transmission. For example, a first subroutine may convert the mined logging data from one format to another format, a second subroutine may filter the mined logging data to remove any unnecessary data, and/or a third subroutine may tag the logging data with the matter identifier. It should be appreciated that in such embodiments, the one or more subroutines may be executed in a particular order in order to optimize the data packaging process. The logging data packaging routine may also adhere to one or more data transmission protocols, and execute one or more processes to prepare the logging data for transmission in compliance with such protocol. For example, the logging data packaging routine may encode the logging data in a data packet, and then add one or more header, parity, signature, and/or security bits to the data packet. Similarly, the logging data packaging routine may include security encryption procedures. After the logging data is prepared for transmission, the method proceeds to block 640. Block 630 of the method 600 may operate in the same or similar manner as block 550 of the method 500, as described above.

The mined logging data is transmitted from the client device (block 640). The logging data may be transmitted by a communication unit (e.g., the communication unit 258 of FIG. 4), of the client device, to the CSR device and/or the proprietary server over a network (e.g., the network 130). One received, the transmitted logging data may be decoded, unpackaged, or otherwise extracted from the data packet transmitted by the client device. In some embodiments, the received logging data may be stored in a local and/or a remote memory/data storage (e.g., the database 146 of FIG. 1) of the CSR device, CSR server, and/or the proprietary server. Block 640 of the method 600 may operate in the same or similar manner as block 560 of the method 500, as described above.

After receiving the logging data, the logging data is analyzed to identify the source of the reported issue (block 650). The CSR device may analyze the received logging data to diagnose the cause or source of the issue. In some embodiments, the logging data may be analyzed by executing an issue identifying routine and/or by a trained customer service representative manually analyzing the logging data. Block 650 of the method 600 may operate in the same or similar manner as block 570 of the method 500, as described above.

An attempt to resolve the reported issue is made based on the analysis of the mined logging data (block 660). In some embodiments, the CSR device and/or proprietary server may attempt to resolve the issue by transmitting a command, signal, direction, and/or operation to be executed by the enterprise application and/or the user of the client device. For example, the CSR device may transmit a signal indicative of an update to the enterprise application that contains a software patch to resolve the reported issue. In some embodiments, the CSR device may be granted remote read/write access to the instance of the enterprise application on the client device in order to troubleshoot the enterprise application. For example, the CSR device may be able to enter commands and/or modify the enterprise application on the client device without being in physical possession of the client device. Accordingly, the CSR device, for example, may be able to remotely modify the settings of the enterprise application or clear a cache in furtherance of resolving the reported issue. Generally speaking, the CSR device may provide one or more potential solutions to resolving the reported issue. For example, the CSR device may reset a password associated with a client profile of the user, or freeze/unfreeze access to the enterprise application using the client profile. When the issue is resolved, the method 600 proceeds to block 570. However, when the issue is not resolved, the method 600 may return to block 650 to continue diagnosing the logging data to identify other potential sources of the reported issue and potential solutions to the reported issue. In some embodiments, when the issue is not resolved, the method 600 may return to block 620 to mine different and/or additional logging data. In such embodiments, different parameters may be selected for mining the logging data. Block 660 of the method 600 may operate in the same or similar manner as block 580 of the method 500, as described above.

Data corresponding to the reported issue and/or how it was resolved is stored after resolving the issue (block 670). Block 670 of the method 600 may operate in the same or similar manner as block 590 of the method 500, as described above. In some embodiments, an issue may be considered resolved for purposes of storing data and terminating the method 600 when a cause of the issue cannot be determined or a solution to the issue cannot be identified after a number of attempts or a duration of attempted remediation.

In some embodiments, generating a matter identifier, transmitting a deep link, mining logging data, analyzing logging data, diagnosing an issue, and/or resolving the issue with the enterprise application based on the extracted logging data may be accomplished using machine learning techniques, such as cognitive learning, deep learning, combined learning, heuristic engines and algorithms, and/or pattern recognition techniques. For example, the proprietary server, the enterprise application, a processor, etc. may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, machine learning programs may be trained by inputting sample data sets or certain data into the programs, such as image, video, audio, mobile device, retailer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant enterprise application logging data for one or more user device details, user request or login details, user device sensors, geolocation information, image data, the enterprise database, a third-party database, and/or other data.

In one embodiment, a processor (and/or machine learning or heuristic engine or algorithm discussed herein) may be trained by providing it with a large sample of logging data with known errors or characteristics, such as login fails. Based upon these analyses, the processing element may learn how to identify errors, characteristics, and/or patterns that may then be applied to analyzing and diagnosing logging data, the enterprise database, a third-party database, and/or other data. For example, the processing element may learn, with the user's permission or affirmative consent, to identify potential sources of errors and/or learn to identify common user initiated errors.

Although the above text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "diagnosing," "analyzing," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed:

1. A method for obtaining device data for diagnosing an issue with an enterprise application, comprising:

receiving, from a customer service representative (CSR) device at a client device via a network, a communication containing a deep link to data on the client device, wherein the deep link includes instructions to mine logging data stored on the client device according to one or more parameters indicating data characteristics of data to be returned in response to engaging the deep link;

initiating, via a user interface of the client device, a request to mine the logging data by engaging the deep link, wherein the logging data corresponds to use of the enterprise application on the client device;

mining, via one or more processors of the client device, the logging data from the client device to obtain mined logging data matching the one or more parameters based upon content of the deep link;

formatting, via the one or more processors of the client device, the mined logging data;

transmitting, via a communication unit of the client device, the formatted mined logging data from the client device to a proprietary server associated with the CSR device via the network;

receiving, at one or more processors of the proprietary server, the formatted mined logging data from the client device via the network;

analyzing, by the one or more processors of the proprietary server, the formatted mined logging data to determine a corrective action for the issue with the enterprise application; and transmitting, from the CSR device to the client device, a signal corresponding to the corrective action;

receiving, at the one or more processors of the client device, the signal corresponding to the corrective action; and implementing, by the one or more processors of the client device, the corrective action to resolve the issue with the enterprise application.

2. The method of claim 1, further comprising:

generating, via the proprietary server, a matter identifier corresponding to a reported issue with operating the enterprise application; and tagging, via the one or more processors of the client device, the mined logging data with the matter identifier.

3. The method of claim 1, further comprising:

initiating, via the client device, an initial communication to the CSR device indicating an issue with operating the enterprise application.

4. The method of claim 1, further comprising:

receiving, at the CSR device via the network, the formatted mined logging data; and storing, via one or more memory storages associated with the proprietary server, the formatted logging data.

5. The method of claim 1, wherein the deep link is embedded in a text message.

6. The method of claim 1, wherein the logging data is mined based on one or more predetermined criteria.

7. The method of claim 1, wherein the logging data is stored in a local memory of the client device for a predetermined duration of time before being deleted.

8. The method of claim 1, wherein the logging data corresponds to one or more front-end interactions and one or more back-end operations of the enterprise application.

9. A non-transitory computer-readable storage medium having stored thereon a set of instructions, executable by one or more processors executing an enterprise application of a client device, comprising:

instructions for receiving, from a customer service representative (CSR) device via a network, a communication containing a deep link to data on the client device, wherein the deep link includes instructions to mine logging data stored on the client device according to one or more parameters indicating data characteristics of data to be returned in response to engaging the deep link;

instructions for initiating, via a user interface of the client device, a request to mine logging data by engaging the deep link, wherein the logging data corresponds to use of the enterprise application on the client device;

instructions for mining, via one or more processors of the client device, the logging data matching the one or more parameters from the client device to obtain mined logging data based upon content of the deep link;

instructions for formatting, via the one or more processors of the client device, the mined logging data;

instructions for transmitting, via a communication unit of the client device, the formatted mined logging data from the client device to a proprietary server associated with CSR device via the network, wherein transmitting the formatted mined logging data causes one or more processors of the proprietary server to analyze the formatted mined logging data to determine a corrective action for the issue with the enterprise application;

instructions for receiving, via the communication unit of the client device, a signal corresponding to the corrective action;

instructions for implementing, via the one or more processors of the client device, the corrective action to resolve the issue with the enterprise application.

10. The non-transitory computer-readable storage medium of claim 9, further comprising:

instructions for generating, via the proprietary server, a matter identifier corresponding to a reported issue with operating the enterprise application; and instructions for tagging, via the one or more processors, the mined logging data with the matter identifier.

11. The non-transitory computer-readable storage medium of claim 9, further comprising:

instructions for receiving, at the CSR device via the network, the formatted mined logging data;

instructions for storing, via one or more memory storages associated with the proprietary server, the formatted logging data.

12. The non-transitory computer-readable storage medium of claim 9, wherein the deep link is embedded in a text message.

13. The non-transitory computer-readable storage medium of claim 9, wherein the enterprise application logging data corresponds to one or more front-end interactions and one or more back-end operations of the enterprise application.

14. A system comprising:

a customer service representative (CSR) device configured to transmit a communication from the CSR device to a client device, wherein the communication contains a deep link to data on the client device and wherein the deep link includes instructions to mine logging data stored on the client device according to one or more parameters indicating data characteristics of data to be returned in response to engaging the deep link;

the client device having one or more processors configured to:

initiate a request, by engaging the deep link on the client device, to mine at least a subset of logging data from a memory storage unit, wherein the logging data corresponds to use of an enterprise application on the client device;

mine at least the subset of the logging data matching the one or more parameters to obtain mined logging data based upon content of the deep link;

format the mined logging data; and transmit the formatted mined logging data from the client device to a proprietary server associated with the CSR device using a communication unit of the client device; and the proprietary server having one or more processors configured to:

receive the formatted mined logging data from the client device via the network;

analyze the formatted mined logging data to determine a corrective action for the issue with the enterprise application; and transmit a signal corresponding to the corrective action to the client device, wherein transmitting the signal causes the client device to implement the corrective action to resolve the issue with the enterprise application.

15. The system of claim 14, wherein the one or more processors are further configured to:

generate a matter identifier corresponding to a reported issue with operating the enterprise application; and tag the mined logging data with the matter identifier.

16. The system of claim 14, wherein the communication unit is configured to initiate an initial communication to the CSR device indicating an issue with operating the enterprise application.

17. The system of claim 14, wherein the communication containing the deep link is a text message.

18. The system of claim 14, wherein the logging data is mined based on one or more predetermined criteria.

19. The system of claim 14, wherein the enterprise application logging data corresponds to one or more front-end interactions and one or more back-end operations of the enterprise application.

\* \* \* \* \*